United States Patent [19]

Lazarus et al.

[11] 4,079,045

[45] Mar. 14, 1978

[54] ESTERIFICATION OF TEREPHTHALIC ACID WITH AN ALKYLENE GLYCOL IN THE PRESENCE OF A PYRIDINE DICARBOXYLIC ACID COMPOUND

[75] Inventors: Stanley David Lazarus, Petersburg; Joseph Donald DeCaprio, Hopewell, both of Va.

[73] Assignee: Allied Chemical Corporation, Morris Township, N.J.

[21] Appl. No.: 701,330

[22] Filed: Jun. 30, 1976

[51] Int. Cl.² ............... C08G 63/68; C08G 63/22
[52] U.S. Cl. ........................... 260/75 N; 8/165; 8/179; 260/75 M
[58] Field of Search ............. 260/75 N, 75 M

[56] References Cited

U.S. PATENT DOCUMENTS

| | | | |
|---|---|---|---|
| 3,024,220 | 3/1962 | Cramer | 260/75 M |
| 3,035,025 | 5/1962 | Broadhead et al. | 260/75 N |
| 3,309,222 | 3/1967 | Caldwell | 428/480 |
| 3,641,111 | 2/1972 | Lazarus | 260/75 M X |

OTHER PUBLICATIONS

Shima et al., Chemical Abstracts, vol. 76:128,676m (1972).
Hasegawa et al., Chemical Abstracts, vol. 65:10,559h (1966).

*Primary Examiner*—Walter C. Danison
*Attorney, Agent, or Firm*—Fred L. Kelly

[57] ABSTRACT

The esterification of an aromatic dicarboxylic acid with an alkylene glycol containing 2 to 10 carbon atoms is described under conditions of direct esterification wherein the resultant polyester has low ether content. The dicarboxylic acid is esterified with the alkylene glycol in the presence of a compound of the formula

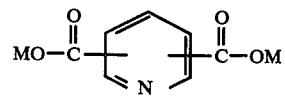

wherein M is H, an alkali metal selected from the group consisting of lithium, sodium and potassium or an alkaline earth metal selected from the group calcium and magnesium.

4 Claims, No Drawings

ESTERIFICATION OF TEREPHTHALIC ACID WITH AN ALKYLENE GLYCOL IN THE PRESENCE OF A PYRIDINE DICARBOXYLIC ACID COMPOUND

BACKGROUND OF THE INVENTION

This invention relates to a process for preparing new linear polyesters. More particularly, it relates to an improved process for direct esterification of an aromatic dicarboxylic acid with an alkylene glycol in the presence of a pyridine dicarboxylic acid compound to provide a prepolymer which can then be polycondensed into high molecular weight polymers having low ether content, suitable for further processing into shaped articles, such as fibers and films. The invention also relates to fibers, filaments, yarns, films, and other structures of said polymers, which have an improved affinity for dyestuffs.

Linear polyesters are well known and are readily prepared by the reaction of dihydric alcohols or their functional derivatives with dibasic carboxylic acids and their ester forming derivatives. Thus, for example, polyethylene terephthalate may be produced either by the ester interchange reaction between dimethyl terephthalate and ethylene glycol or the so-called direct esterification method as disclosed in U.S. Pat. No. 2,465,319, and more recently in U.S. Pat. Nos. 3,024,220; 3,050,533 and 3,050,548.

Although processes for the preparation of polyesters by the direct esterification of a polycarboxylic acid with an alkylene glycol are known, many problems remain, partly because the product obtained is inferior for many end uses. For example, when polyethylene terephthalate is prepared from ethylene glycol and terephthalic acid, the ethylene glycol can also self-condense to produce diethylene glycol and water. Once the diethylene glycol is formed, it is preferentially incorporated into the polymer since it has the same reactivity as the ethylene glycol and a lower volatility. The adverse influence of copolymeric poly(diethylene glycol)terephthalate on the thermal stability of polyethylene terephthalate is now well known. From changes observed in intrinsic viscosity, percent ether, hydroxyl and carboxyl end groups during heat aging of such copolymeric compositions, it is apparent that the mechanisms for decomposition are operative below melt temperatures and can rapidly destroy such copolymers.

SUMMARY OF THE INVENTION

It is a prime object of this invention to provide an improved process for the direct esterification of a polycarboxylic acid with an alkylene glycol wherein the resultant polymer has low ether content. Another object of this invention is to provide a new acid dyeable linear high molecular weight fiber and film forming polyester. A further object of this invention is to provide an improved process for preparing a new linear polyester polymer suitable for use in making films and filaments of improved dye receptivity.

The above objects are accomplished in accordance with this invention in which the production of polyesters, particularly the esterification stage thereof, is carried out under direct esterification conditions in the presence of a small quantity of a pyridine dicarboxylic acid or salt thereof. The present invention provides an improved process for the preparation of a linear high molecular weight film and fiber forming polyester which comprises esterifying an aromatic dicarboxylic acid with an alkylene glycol containing 2 to 10 carbon atoms per molecule under direct esterification conditions in the presence of from about 0.25 to about 5 weight percent based on the weight of the aromatic dicarboxylic acid of a heterocyclic compound of the formula

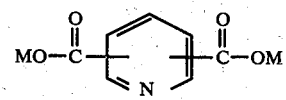

wherein M is H, an alkali metal selected from the group consisting of lithium, sodium, and potassium or an alkaline earth metal selected from the group consisting of calcium and magnesium; the molecular ratio of total acid to glycol in said esterification being between 1.0:1.0 and 1.0:2.5, the temperature range being about 200° to about 300° C., the pressure being at least atmospheric.

It will be understood that the linear polyesters of this invention contain in relatively small amounts the recurring units represented by the following formula

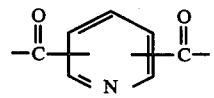

The presence of said units significantly improves the dye receptivity of the fiber, particularly to conventional acid dyes such as Acid Yellow 19, Acid Red 145, and Acid Blue 72. The thus modified polyesters are preferably linear terephthalate polyesters, i.e., polyesters of a glycol containing from 2 to 10 carbon atoms and a dicarboxylic acid component containing at least about 75% terephthalic acid. The remainder, if any, of the dicarboxylic acid component may be any suitable dicarboxylic acid such as sebacic acid, adipic acid, isophthalic acid, sulfonyl-4,4'-dibenzoic acid, or 2,8-dibenzofurandicarboxylic acid. The glycols may contain more than two carbon atoms in the chain, e.g., butylene glycol decamethylene glycol, and bis-1,4-(hydroxymethyl) cyclohexane.

DESCRIPTION OF THE PREFERRED EMBODIMENTS

The objects of this invention are preferably accomplished in accordance with this invention in which the production of high molecular weight linear terephthalate polyesters, as described above, particularly the esterification stage thereof is carried out under direct esterification conditions in the presence of from about 0.5 to about 3 weight percent based on the weight of the terephthalic acid of a compound selected from the group consisting of pyridine dicarboxylic acid (2,4), pyridine dicarboxylic acid (2,5), pyridine dicarboxylic acid (2,6), and pyridine dicarboxylic acid (3,5), or the lithium, sodium, potassium, calcium or magnesium salts thereof.

Desirably, the direct esterification in accordance with this invention is carried out with the mole ratio of total acid to the glycol between 1.0:1.0 and 1.0:2.5, and preferably with the mole ratio between 1.0:1.1 and 1.0:1.7. The excess glycol is vaporized and recovered in the process. Since the pyridine dicarboxylic acid compound is incorporated into the polymer chain, it does not appear in the recovered glycol.

The direct esterification reaction may start at a temperature as low as about 200° C. and range up to about 300° C. The reaction is carried out in the absence of an oxygen-containing gas and may be carried out at atmospheric or at elevated pressure. Any remaining glycol is distilled off after the direct esterification step is complete. A polycondensation catalyst may then be added, if not added prior to the esterification step. Such catalysts are, for example, the compounds of antimony, lead oxide, titanium butoxide, manganese acetate, and zinc acetate, as well as others. They are generally used in small amounts, such as from about 0.005 to about 1.5 percent based on the weight of the reactants. The condensation or polymerization reaction is usually carried out at a reduced pressure which can be as low as 0.1 mm of Hg and a temperature of from about 260° to about 300° C. The condensation or polymerization reaction is carried out under these conditions for periods of about 1.5 to about 10 hours, and preferably from about 2 to about 6 hours until a polymerized polyester product of the requisite molecular weight, as determined by viscosity or other convenient physical measurement is obtained. Continuous agitation during the condensation or polymerization reaction provides maximum exposure to the vacuum which further assists in removing glycol and by-products.

Various additives can be added with the terephthalic acid and glycol feed or during the direct esterification reaction to modify the characteristics of the final polymer for specific end uses. For example, a small amount of diphenylene phenylene diamine can be added if fatigue resistance is desirable. Other well known additives can be used to enhance and/or control other characteristics of the finished polymer, such as static dissipation, flammability, luster, adhesion, etc.

The following examples in which all parts and percentages are by weight unless otherwise specified, are given to further illustrate the invention.

EXAMPLE 1

The reactor used is a 1 gallon stainless steel autoclave equipped with a double spiral agitator turning at 30 r.p.m. The reactor is preheated to 95° C., and 1800 grams of terephthalic acid, 1345 grams of ethylene glycol, 9 grams of pyridine dicarboxylic acid (2,5), and 1.5 grams of antimony triacetate are charged. The reactor is purged with nitrogen, heated to 200° C., and pressurized with 75 psig. of nitrogen. The reactor is then heated until the reaction mixture reaches 270° C. Generated vapor is vented to the atmosphere to maintain a pressure of 75 psig. in the reactor. When reactor pressure no longer shows a tendency to rise above 75 psig., the residual pressure is slowly vented and the reaction mixture is swept with nitrogen for 15 minutes. At this point, the esterification reaction step is considered complete, and the polycondensation step is begun. Vacuum is applied to the reactor until the reaction pressure reaches 0.1 mm Hg, and the reaction temperature is increased to 290° C. This reaction temperature and pressure are maintained for 2 hours, after which nitrogen is introduced to adjust the pressure to atmospheric. The resulting polymer is extruded through a valve at the bottom of the reactor into a water bath and the polymer is pelletized in a Wiley Mill. For convenience, this polymer is called Polymer A.

A control polymer is made in the same manner as Polymer A except without the addition of pyridine dicarboxylic acid (2,5). For convenience this control polymer is called Polymer B.

The analyses of the polymers are as follows:

|  | Melting Point | Diethylene Glycol, % | Intrinsic Viscosity |
|---|---|---|---|
| Polymer A | 254° C. | 1.47 | 0.95 dl/g |
| Polymer B | 241° C. | 4.82 | 0.96 dl/g |

Solvent extraction of Polymer A with boiling ethyl alcohol to remove unreacted pyridine dicarboxylic acid, followed by infrared analysis, shows that the pyridine compound becomes part of the polymer chain.

EXAMPLE 2

The procedure of Example 1 is followed except that 18 grams instead of 9 grams of pyridine dicarboxylic acid (2,5) is used. (Said 18 grams of pyridine dicarboxylic acid (2,5) may be expressed as 1 percent pyridine dicarboxylic acid (2,5) based on the weight of terephthalic acid.) For convenience, the polymer produced is called Polymer C. The following table shows results of analyses of Polymer C.

|  | Melting Point | Diethylene Glycol, % | Intrinsic Viscosity |
|---|---|---|---|
| Polymer C | 248° C. | 1.40 | 0.86 dl/g |

EXAMPLE 3

The procedure of Example 1 is followed except that 9 grams of pyridine dicarboxylic acid (2,6) is used instead of 9 grams of pyridine dicarboxylic acid (2,5). For convenience, the polymer product is called Polymer D. The following table shows results of analyses of Polymer D.

|  | Melting Point | Diethylene Glycol, % | Intrinsic Viscosity |
|---|---|---|---|
| Polymer D | 252° C. | 1.65 | 0.93 dl/g |

EXAMPLE 4

Polymer A and Polymer B of Example 1 are dried in a vacuum oven at 160° C. for 16 hours and spun on a one-inch extruder. The extrusion and spin block temperatures are about 295° C. Polymers A and B are drawn at a draw ratio of 4.0 to 1 into 70 denier, 16 filament yarns, which are knitted into Sleeve A and Sleeve B, respectively. A swatch from each is dyed in conventional manner with Acid Blue 17. Visually, Sleeve A is observed to dye to a much greater extent than Sleeve B.

In additional tests, the pyridine dicarboxylic acid (2,5) of Example 1 was incorporated into a polyester formed by conventional ester interchange reaction of dimethyl terephthalate and ethylene glycol. Yarn made from this polymer was found to have enhanced dyeability comparable to yarn made from Polymer A.

We claim:

1. A process for the preparation of a linear high molecular weight fiber forming polyester which comprises esterifying terephthalic acid with ethylene glycol under direct esterification conditions in an inert atmosphere at a pressure of at least atmospheric and in the presence of from about 0.25 to about 1.0 weight percent based on the weight of the terephthalic acid, of a heterocyclic compound selected from the group consisting of pyridine dicarboxylic acid (2,4), pyridine dicarboxylic acid (2,5), pyridine dicarboxylic acid (2,6) and pyridine dicarboxylic acid (3,5), the molecular ratio of total acid to glycol in said esterification being between 1.0:1.1 and 1.0:1.7, the temperature range being between about 200° to about 300° C., whereby the diethylene glycol incorporated into the polyester is significantly reduced and the dyeability of the polyester is improved.

2. The process of claim 1 wherein said heterocyclic compound is pyridine dicarboxylic acid (2,5).

3. The process of claim 1 wherein said heterocyclic compound is pyridine dicarboxylic acid (2,6).

4. The process of claim 1 wherein said direct esterification is carried out in the presence of about 0.5 weight percent based on the weight of said terephthalic acid, of said heterocyclic compound.

* * * * *